US010465830B2

(12) United States Patent
Caillot et al.

(10) Patent No.: US 10,465,830 B2
(45) Date of Patent: Nov. 5, 2019

(54) HYDRAULIC CONNECTOR, PARTICULARLY FOR MOTOR VEHICLE WINDSCREEN WIPER SYSTEM

(71) Applicant: Valeo Systèmes d'Essuyage, Le Mesnil Saint Denis (FR)

(72) Inventors: Gérald Caillot, Cernay la Ville (FR); Jean-Michel Jarasson, Le Mesnil Saint Denis (FR); Vincent Izabel, Chilly Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 851 days.

(21) Appl. No.: 14/562,913

(22) Filed: Dec. 8, 2014

(65) Prior Publication Data

US 2015/0089762 A1    Apr. 2, 2015

Related U.S. Application Data

(63) Continuation of application No. 13/002,816, filed as application No. PCT/EP2009/005138 on Jul. 15, 2009, now Pat. No. 9,669,805.

(30) Foreign Application Priority Data

Jul. 15, 2008    (FR) .................................. 08 04033

(51) Int. Cl.
*F16L 47/32*    (2006.01)
*B60S 1/38*    (2006.01)
(Continued)

(52) U.S. Cl.
CPC ............. *F16L 47/32* (2013.01); *B60S 1/3862* (2013.01); *B60S 1/4038* (2013.01); *B60S 1/524* (2013.01);
(Continued)

(58) Field of Classification Search
CPC ...... B60S 1/40; B60S 1/46; B60S 1/38; B60S 1/3886; B60S 1/3893; B60S 1/3896;
(Continued)

(56) References Cited

U.S. PATENT DOCUMENTS 4,339,839 A      7/1982  Knights
5,251,938 A  *  10/1993  Erickson ............... F16L 37/084
                                                            285/121.6
(Continued)

FOREIGN PATENT DOCUMENTS

DE            100 00 372 A1    8/2001
DE    10 2004 056 835 A1    6/2006
(Continued)

OTHER PUBLICATIONS

Machine language translation of description portion of French publication 2750381, published Jan. 1998.*
(Continued)

*Primary Examiner* — Gary K. Graham
(74) *Attorney, Agent, or Firm* — Osha Liang LLP (57) ABSTRACT

The invention relates to a hydraulic connector, particularly for a motor vehicle windscreen wiper system. The connector is designed to be mounted on a wiper blade fitted with a perforated pipe carrying cleaning and de-icing fluid, and comprises at least one inlet coupling suitable for connection to a fluid feed, and at least one distributor provided with at least one outlet coupling designed to be connected to the perforated pipe. The connector also includes at least one internal path for carrying the fluid from the inlet coupling to the distributor. Thus, by means of the presence of the internal path through the connector, the inlet coupling can be positioned at various locations on the connector, without feeding directly into the distributor.

16 Claims, 6 Drawing Sheets

(51) Int. Cl.
*B60S 1/40* (2006.01)
*B60S 1/52* (2006.01)
*F16L 41/02* (2006.01)
*F16L 41/03* (2006.01)

(52) U.S. Cl.
CPC ............... *F16L 41/02* (2013.01); *F16L 41/03* (2013.01); *B60S 1/381* (2013.01)

(58) Field of Classification Search
CPC ...... B60S 1/3894; B60S 1/3862; B60S 1/524; B60S 1/522; F16L 41/02; F16L 41/03; F16L 47/26; F16L 47/32
USPC ....... 15/250.04; 239/284.1; 285/125.1, 130.1
See application file for complete search history.

(56) References Cited

U.S. PATENT DOCUMENTS

| | | | |
|---|---|---|---|
| 5,433,382 A | 7/1995 | Baumgarten et al. | |
| 7,210,189 B2 | 5/2007 | Nacamuli | |
| 7,581,279 B2 | 9/2009 | Baseotto et al. | |
| 2003/0020277 A1* | 1/2003 | Palmiri | F28F 9/02 285/125.1 |
| 2007/0067941 A1 | 3/2007 | Huang | |
| 2008/0060161 A1 | 3/2008 | Boland et al. | |
| 2008/0263806 A1* | 10/2008 | Egner-Walter | B60S 1/386 15/250.01 |

FOREIGN PATENT DOCUMENTS

| | | |
|---|---|---|
| DE | 10 2006 013 900 A1 | 9/2007 |
| EP | 0 724 993 A1 | 8/1996 |
| EP | 1 918 167 A1 | 5/2008 |
| FR | 2750381 * | 1/1998 |
| WO | 2006/056406 A1 | 6/2006 |

OTHER PUBLICATIONS

International Search Report w/translation from PCT/EP2009/005138 (6 pages).

* cited by examiner

HYDRAULIC CONNECTOR, PARTICULARLY FOR MOTOR VEHICLE WINDSCREEN WIPER SYSTEM

CROSS-REFERENCE TO RELATED APPLICATIONS

This application is a continuation application and claims the benefit under 35 U.S.C. § 120 of U.S. patent application Ser. No. 13/002,816, filed on Jan. 6, 2011, entitled "Hydraulic Connector, Particularly for Motor Vehicle Windscreen Wiper System," which is a national stage application of PCT/EP2009/005138 filed Jul. 15, 2009, which claims priority to FR 08/04033 filed Jul. 15, 2008.

The present invention is aimed at a hydraulic connector, more particularly used in a windscreen wiper system for example for a motor vehicle. The other objects of the invention are as follows: a windscreen wiper system provided with a drive arm, a wiper blade and the connector; only one drive arm provided with a connector; only one wiper blade provided with a connector.

Windscreen wiper systems, such as those used for cleaning or de-icing the windscreen of a motor vehicle, generally include a drive arm connected to a source of fluid or cleaning liquid and/or de-icing liquid and to a motor as well as a wiper blade coupled to the drive arm.

During the wiping, a relative displacement exists between the arm and the blade so that the coupling between the arm the blade must enable the rotation of the blade with respect to the arm.

In addition, the blade must be easily coupled and disconnected from the arm to enable the displacement or maintenance thereof.

An adaptor is thus generally provided between the arm and the blade to provide such coupling and the above mentioned relative displacements between the arm and the blade.

In the case where the ejection of the fluid is from nozzles, for example positioned on the hood of the vehicle, the coupling between the arm and the blade has no other function than the ones mentioned above.

On the contrary, it can be provided for the fluid to be directly ejected from the wiper blade to spray the windscreen with the view to increasing the accuracy and efficiency of the cleaning or of the de-icing operation.

In this case, it is necessary to bring the fluid up to the blade. Generally, the blade includes one or two perforated pipes. The fluid inlet pipe(s) can be directly connected to such perforated pipes. But the fluid connection is then not very reliable because of the relative displacement between the arm and the blade. In addition, it is then difficult to conceal and to protect the inlet pipes. Eventually, the connection and disconnection are not simple operations to the user who wants to replace a worn blade.

The connection adaptor between the arm and the wiper blade is provided for being used to the hydraulic connection too, as described for example in document WO 2006/056406, so as to solve the above mentioned problems.

In this document, the connection element can be broken down into an adaptor 15 provided with a through hole 19 for assembling in rotation with the arm, and a cleaning fluid distributor 27 which is finally assembled in the adaptor 15.

The distributor 27 is provided with two outlet couplings 21 at each one of the ends thereof, directly intended to be connected to one perforated pipe of the wiper blade and a perpendicular inlet coupling 22 directly opening into the central distribution cylinder intended to be connected to the fluid inlet coupling.

In the case of a wiper blade provided with two perforated pipes, two symmetrical connection elements are provided assembled by cooperation of a plug set 17 of the first connection element plus the hole 18 of the second connection element.

The problem raised by such a connection element is that it is complex and is expensive to produce and to assemble.

In addition, the connection/disconnection of the wiper blade is not simple.

The risk also exists for the distributor to disconnect from the adaptor because of the relative displacements between the arm and the wiper blade.

In addition, the inlet coupling directly opens into the distributor, on the side thereof, which makes it difficult to protect the fluid inlet pipe and to conceal such pipe for a better appearance.

Another problem is raised by the overpressure stress generally generated parallel to the blade, then to the distributor, so long as the fluid inlet pipe is generally concealed and guided along the arm and thus opens at the connection oriented parallel to such blade. This overpressure stress may then disconnect the inlet pipe from the inlet coupling in the distributor, which is then oriented perpendicularly to such overpressure stress.

The object of the invention is thus to bring a solution to the problems mentioned above among other problems.

According to a first aspect, the invention thus relates to a hydraulic connector, more particularly to a motor vehicle windscreen wiper system, intended to be assembled to a wiper blade provided with at least one perforated pipe carrying fluid, more particularly cleaning and de-icing fluid.

The connector includes at least an inlet coupling suitable for connection to a fluid feed, and at least one distributor provided with at least one outlet coupling designed to be connected to the perforated pipe.

The connector also includes at least one internal path for carrying the fluid from the inlet coupling to the distributor.

Thus, by means of the presence of the internal path through the connector, the inlet coupling can be positioned at various locations on the connector, without feeding directly into the distributor.

It can more particularly be positioned so as to reduce the effects of the overpressure stress, to enable the concealing and protecting of the connection and to make the connection/disconnection easier.

Preferably, the inlet coupling is oriented parallel to the distributor. Alternately, it may be oriented perpendicularly to such a distributor, from the top of the connector.

In both cases, the connection/disconnection is easier since the fluid feed is oriented parallel to the wiper blade, from the top of the connector.

The connector can be broken down into two parts made in one piece. The first one of such two parts made in one piece, preferably obtained by moulding a plastic material, including the inlet coupling and a first portion of the internal path. The second of such parts made in one piece, is also preferably obtained by moulding plastic material, and including the rest of the internal path and the whole or a part of the distributor.

The connector thus formed can then be manufactured easily, for example by moulding both above mentioned parts made in one piece, in spite of the presence of an internal path, which may be complex.

Such two parts made in one piece are preferably sealingly assembled, for example by ultrasonic welding or by overmoulding a joint. Such joint may be made of the same material as that of said first and/or said second parts made in one piece.

Alternately, the connector is composed of a body made in one piece, preferably obtained by moulding a plastic material.

It is then necessary to provide for one or more ports for the unmolding operation which must be plugged after the unmolding, as a function of the complexity of the internal path.

In both cases, the manufacturing of the connector is simplified, as well as the connection/disconnection thereof, so long as it forms an assembly made in one piece, possibly after assembling both above mentioned parts.

The connector may include two inlet couplings suitable for connection to a fluid feed.

The connector may include two distributors, more particularly when the connector is intended to be used with a wiper blade provided with two perforated pipes carrying a fluid.

Each one of these distributors is then provided with at least one outlet coupling intended to be connected to either one of said two perforated pipes.

One or more of such distributors may then be provided with two opposite outlet couplings intended to be connected to the perforated pipe.

The distributor or several distributors may be provided with a port, preferably in the middle thereof, which makes it possible to spray the windscreen, in the middle of the wiper blade too, where the connector is located and/or where the perforated pipe is interrupted by such a connector.

One or several inlet couplings may be a male coupling, for example of the canula type, intended to be connected to a female fluid feed.

Alternately, one or several inlet couplings may be a female coupling for example of the port type at the surface of the connector, intended to be connected to a male fluid feed, for example of the canula type.

The invention also relates, according to another aspect, to a windscreen wiper system more particularly for a motor vehicle.

The system includes a wiper blade fitted with at least a perforated pipe carrying fluid, more particularly cleaning and de-icing fluid.

The wiper blade is connected to a drive arm by an adaptor.

The adaptor is rotatingly connected to a connector, as mentioned hereabove.

The connector is connected on the one hand by the outlet coupling(s) thereof to the perforated pipe(s) and on the other hand by said inlet coupling(s) thereof to one or two fluid feed(s).

The invention also relates, according to another aspect, to a wiper blade, more particularly for a wiper blade system for a motor vehicle provided with at least one perforated pipe carrying fluid, more particularly cleaning and de-icing fluid.

The wiper blade includes a connector as mentioned above connected by the outlet coupling(s) thereof to said perforated pipe(s).

Finally, the invention relates, according to another aspect, to an arm driving the wiper blade, more particularly for a motor vehicle.

The arm includes an adaptor rotatingly connected to a connector as mentioned above.

The connector is suitable for connection by the inlet couplings thereof to one or two fluid feed(s).

Other characteristics and advantages of the invention will appear more clearly and completely when reading the following descriptions of the preferred alternative embodiments which are given as non limitative examples and while referring to the following appended drawings:

Figures 1A, 1B:
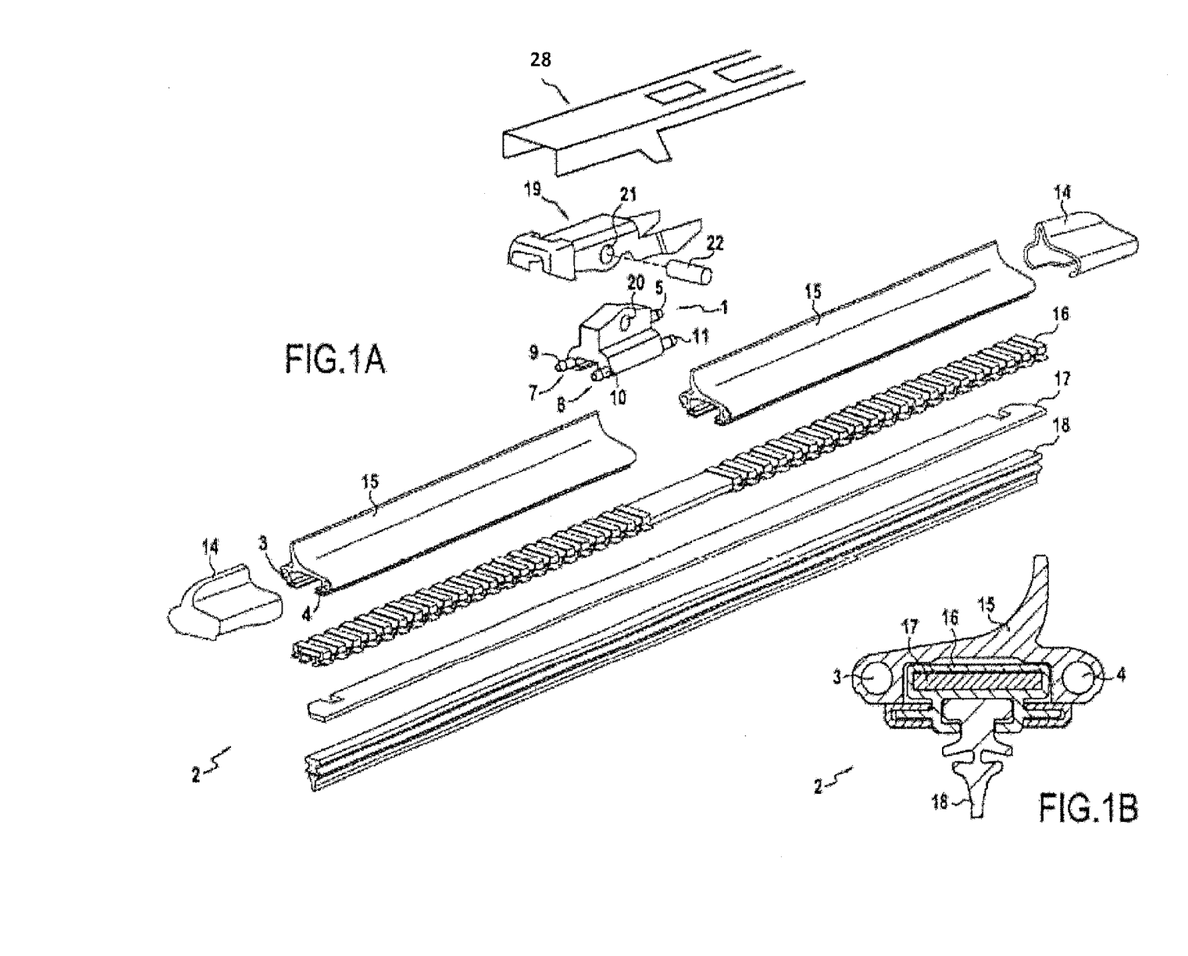
FIGS. 1a and 1b: schematically show one exemplary wiper blade respectively as seen in an exploded perspective and in transversal cross-section view.

As shown in FIGS. 1a and 1b, the wiper blade 2 is connected to or intended to be connected to a drive arm 28 via an adaptor 19 to form a windscreen wiper system.

The adaptor 19 is rotatingly connected to a hydraulic connector 1 which is described hereinunder according to various embodiments, while referring to FIGS. 2 to 8, by means of a hinge axis 22 and the assembling holes 20 and 21 respectively provided in the connector 13 and the adaptor 19.

Such hydraulic connector 1, in this alternate embodiment, includes an inlet coupling 5 intended to be connected to the cleaning and/or de-icing fluid feed.

The connector 1 further includes several outlet connections 9, 10, 11 intended to be connected to the blade 2 perforated pipes 3, 4.

More precisely, the connector 1 includes two distributors 7 and 8 which each end by two outlet connections placed at their respective opposite outlets.

Thus, the distributor 7 includes a first outlet connector 9 and a second one at the opposite end thereof, which is not visible on the perspective representation in FIG. 1a. In addition, the distributor 8 includes a first outlet connector 10 and a second one 11 at the opposite end thereof.

As mentioned hereabove, the outlet connectors 9, 10, 11 of connector 1 are suitable for connection to the perforated pipes 3, 4 of the wiper blade 2, which are, in this example, formed in the upper part of the blade 2, which plays the part of the deflector 15, formed in two parts 15, connected on either side of the connector 1. Such perforated pipes 3, 4 include holes making it possible to spray the cleaning and/or de-icing fluid onto the windscreen.

As can be seen more precisely on the transversal cross-section in FIG. 1b, the deflector 15 has a profile so that it receives a mount 16. Such mount 16, according to the specific profile thereof, receives in turn a strip 17 and in the lower part thereof a rubber wiping blade 18 or the like.

Two tips or caps 14 close the end of each part of the deflector 15 so as to close the end of the perforated pipes 3, 4 to prevent the mount 16, the strip 17 and the blade 18 to slide out of their respective recesses as well as for aesthetic reasons.

Figure 2A:
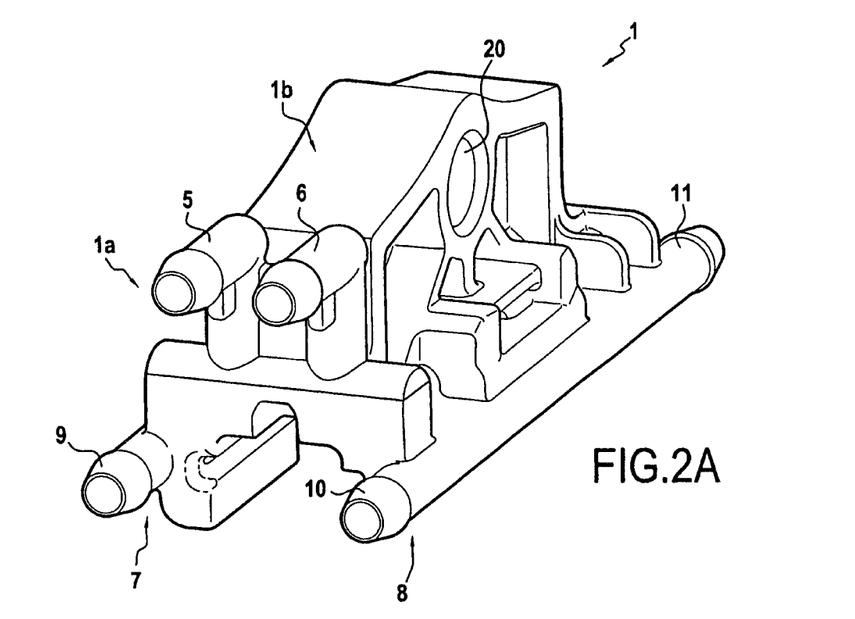
FIGS. 2a and 2b: schematically show one exemplary hydraulic connector respectively as seen in an exploded perspective and in transversal cross-section view.
Figure 2B:
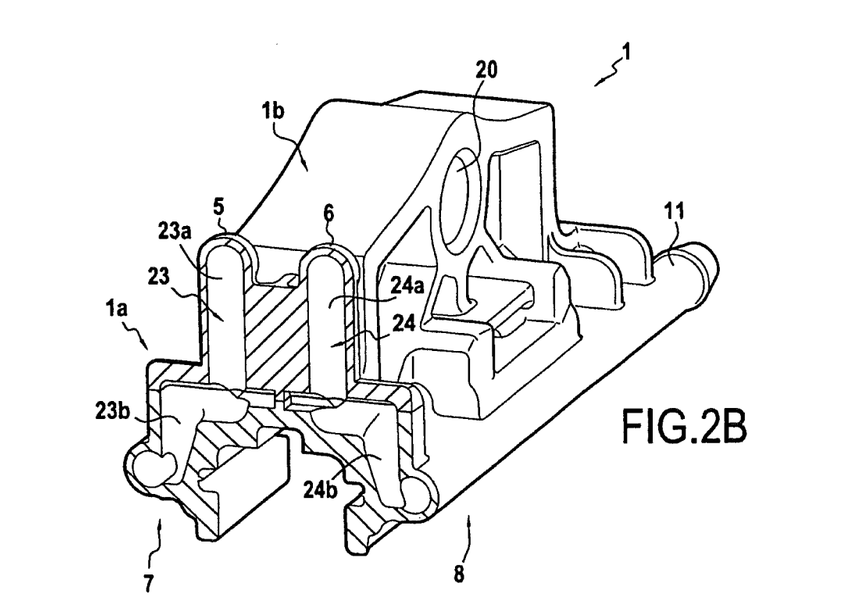

In the first exemplary hydraulic connector shown in FIGS. 2a and 2b, each distributor 7 and 8 ends with two opposite outlet connections 9, 10, 11, as explained above.

The connector 1 is further provided with two inlet couplings 5, 6, each one being connected to the fluid feed (the same one or two different ones). Such inlet couplings 5, 6 are oriented parallel to the distributors 7 and 8, which are also suitable for being oriented as an extension of, then parallel to the perforated pipes 3 and 4 of the wiper 2, in FIG. 1a.

So long as the wiper 2 is oriented substantially parallel to the drive arm 28, at least in the rest position, and as the fluid feed connected to the inlet couplings 5 and 6 follows the drive arm 28, such inlet couplings 5 and 6 are then oriented substantially parallel to the orientation of the fluid feed.

In this example, the connector 1 can be broken down into a first part 1a made in one piece, moulded in plastic material, and a second part 1b, made in one piece, also moulded in plastic material.

Both parts 1a and 1b made in one piece are assembled together so as to form a connector 1 made in one piece.

The assembly must be sealed, and can be obtained for example by ultrasonic welding, or par over-moulding a joint, preferably made of the same plastic material as the one used for either one of parts 1a, 1b, or both.

As can be more precisely seen in the cross sectional view in FIG. 2b, an internal path 23 connects the inlet coupling 5 to the distributor 7, and another internal path connects the inlet coupling 6 to the distributor 8.

Each one of the two internal paths 23 and 24 includes a first portion 23a, 24a, starting from the inlet coupling 5 or 6 and belonging to the first part 1a made of one piece.

The rest of the internal path 23, marked 23b, starts from the portion 23a to meet the distributor 7, and belong to the second part 1b made of one piece.

Similarly, the rest of the internal path 24, marked 24b, starts from the portion 24a to meet the distributor 8 and belongs to the second part 1b made of one piece.

Thus, the first part made of one piece 1a includes both inlet couplings 5 and 6, and the first two portions 23a and 23b of the two internal paths 23 and 24, respectively.

In addition, the second part 1b made in one piece includes the rest 23 of the internal path 23 and the rest 24b of the internal path 24, as well as both distributors 7 and 8.

Figure 3A:
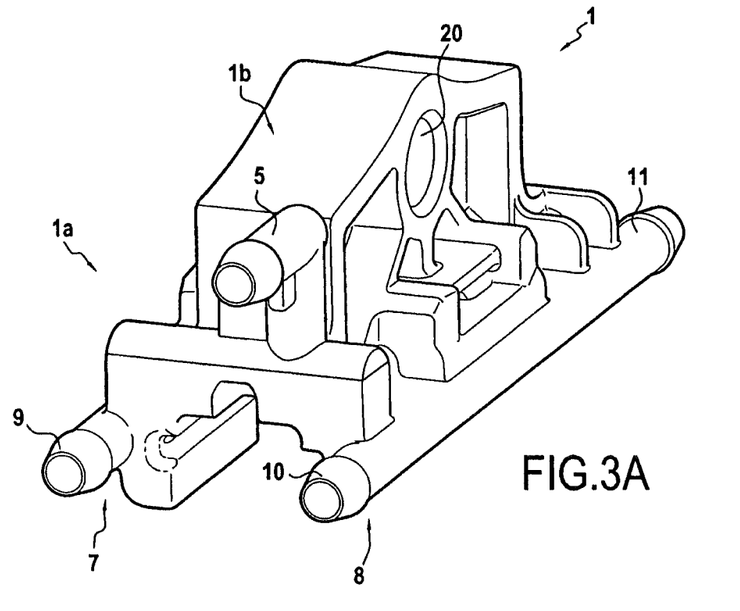
FIGS. 3a and 3b: schematically show another exemplary hydraulic connector respectively as seen in an exploded perspective and in transversal cross-section view.
Figure 3B:
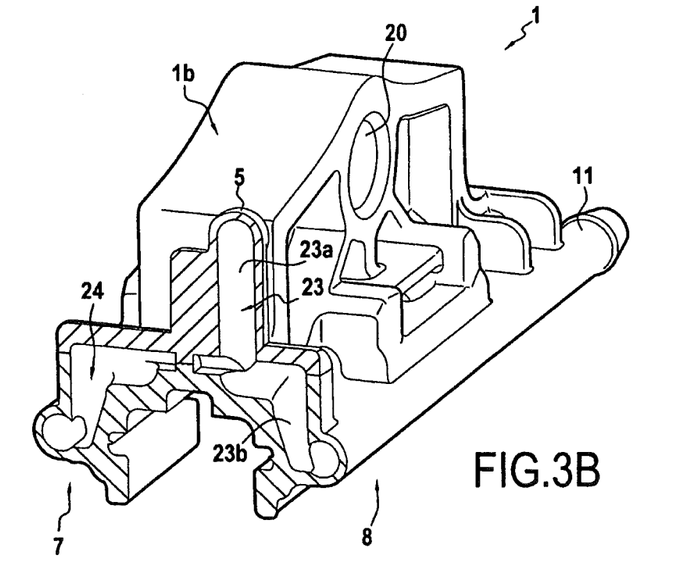

In the second exemplary connector 1, as shown in FIGS. 3a and 3b, only one inlet coupling 5, on the first part 1a made in one piece of the connector 1, supplies the distributor 8 on the second part 1b made in one piece of the connector 1, through the internal path 23 subdivided into a first portion 23a in the first part 1a made in one piece and the rest 23b in the second part 1b made in one piece.

The internal path 24 which opens into the distributor 7, is connected to no inlet coupling.

The first parts 1a made in one piece can then be manufactured separately, with only one 5 or two 5 and 6 inlet couplings, and the second parts 1b made in one piece with only one or two distributors 7 and 8, and to assemble these to form a connector 1 suitable for one type of blade 2 or another one (two perforated pipes, one perforated pipe, . . . ).

Figure 4A:
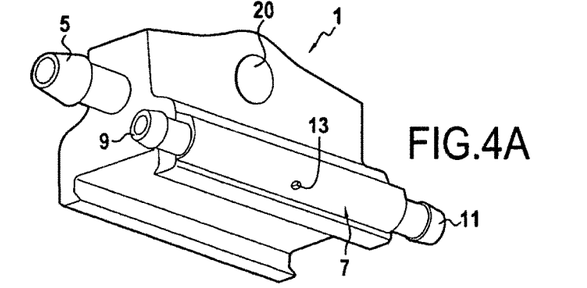
FIGS. 4a and 4b: schematically show a third exemplary hydraulic connector respectively as seen in an exploded perspective and in transversal cross-section view.
Figure 4B:
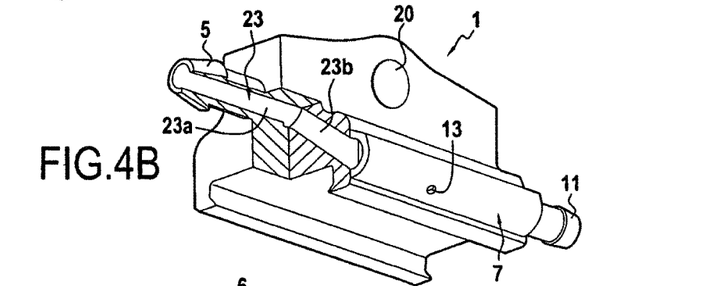

In the third exemplary connector 1, such as shown in FIGS. 4a and 4b, only one inlet coupling 5, in a central position, is connected to only one distributor 7, through an internal path 23.

Such distributor 7 may include a hole 13, preferably in the middle thereof, enabling the spraying of the fluid circulating in the pipe of the distributor 7 onto the windscreen to be cleaned or de-iced, at a place of the blade where the perforated pipe 3 or 4 (refer to FIG. 1a) is interrupted.

Figure 5A:
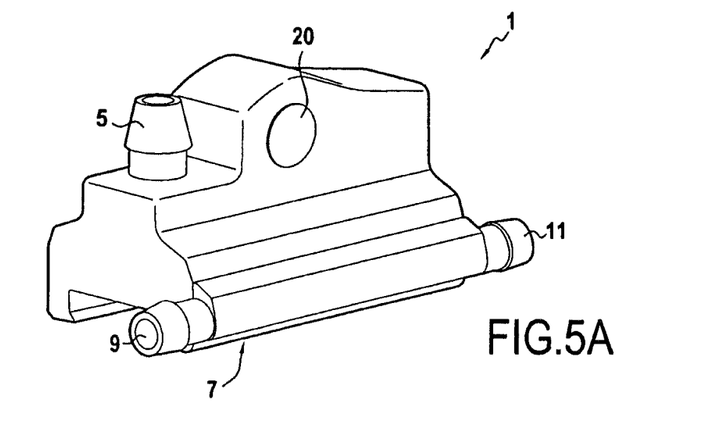
FIGS. 5a and 5b: schematically show a fourth exemplary hydraulic connector respectively as seen in an exploded perspective and in transversal cross-section view.
Figure 5B:
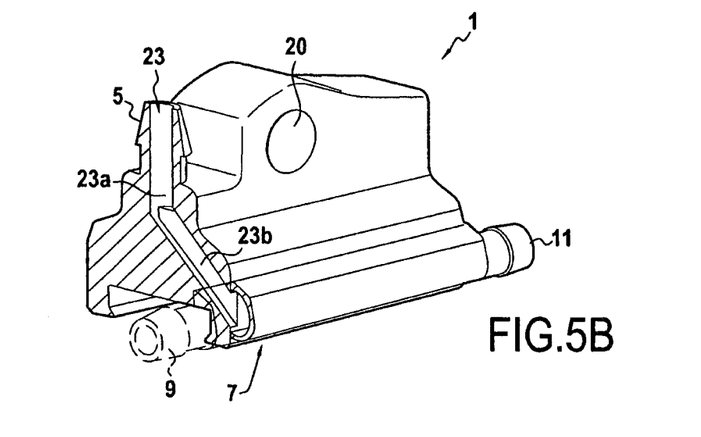

FIGS. 5a and 5b show a fourth exemplary connector 1, having only one inlet coupling 5 connected to only one distributor 7.

In this example, the only difference with the connector in FIGS. 4a and 4b lies in that the inlet coupling is oriented perpendicularly to the distributor 7, from the top of the connector 1.

The fluid feed, generally oriented substantially parallel to the distributor (refer to the above explanations referring to FIGS. 1a, 2a and 2b), is then connected to the inlet coupling 5 through a "L"-shaped junction element concealed and locked by the adaptor 19 (refer to FIG. 1).

In this example as in the previous ones, the inlet coupling/couplings 5, 6 are male connections, of the canula type, entering the female fluid feed.

Figure 6:
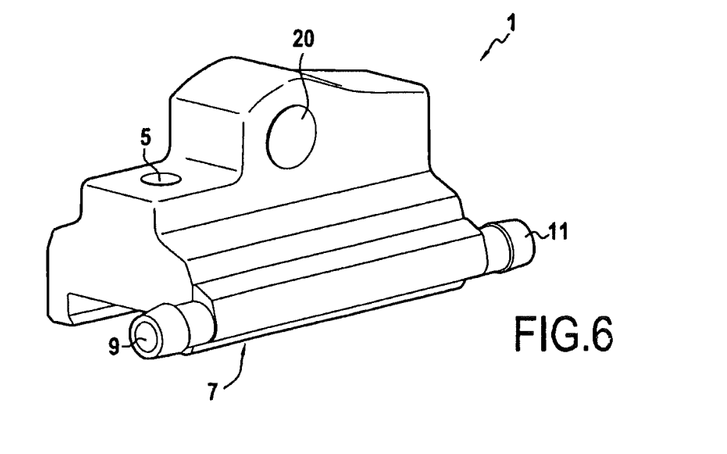
FIG. 6: schematically shows a fifth exemplary hydraulic connector, fully in perspective.

Conversely, in the fifth exemplary connector 1, shown in FIG. 6, the inlet coupling 5 is a female connection or port 5, wherein the male fluid feed, for example of the canula type, is liable to enter.

Except for this difference, such fifth example connector 1 is identical in every way to the fourth exemplary connector 1 as shown in FIGS. 5a and 5b.

Figures 7A, 7B:
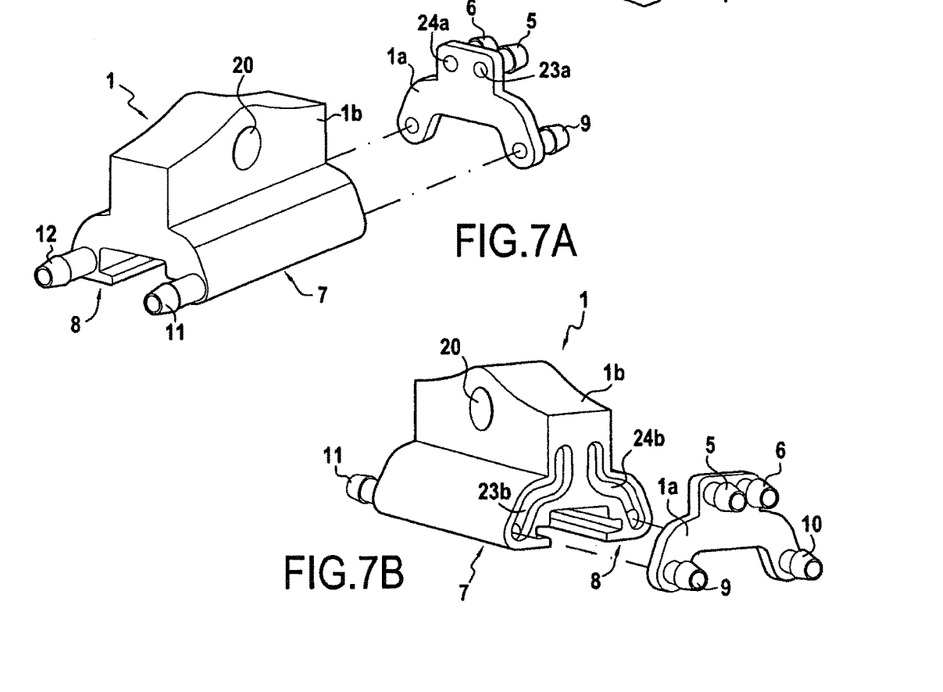
FIGS. 7a and 7b: schematically show a sixth exemplary hydraulic connector, respectively as seen in an exploded perspective and in transversal cross-section view.

The sixth exemplary connector 1, as shown in FIGS. 7a and 7b, shows two inlet couplings 5, 6, each one being connected to a distributor 7, 8, through an internal path 23, 24.

Such connector 1 is also composed of two parts 1a and 1b made in one piece and sealing assembled as explained hereabove.

In this example, the first part 1a made in one piece includes both inlet couplings 5 and 6, and the very first respective portions 23a and 24a of the internal paths 23 and 24, corresponding to the respective horizontal parts of such internal paths 23 and 24, aligned with the inlet couplings 5 and 6.

The second part 1b made in one piece includes the respective remaining parts 23b, 24b of each one of the internal paths 23 and 24 and the greatest part of each distributor 7 and 8 (except for the short horizontal portion aligned with each outlet coupling 9 and 10).

This second part 1b made in one piece thus includes the greatest portion of each one of the internal paths 23 and 24, as well as the greatest part of each distributor 7 and 8.

These remaining parts 23b and 24b of the internal paths 23 and 24 are composed of longitudinally open channels, which are sealingly closed when both parts 1a and 1b made in one piece are sealing assembled, as explained hereabove.

It can be noted that, in this sixth example, the outlet couplings 9 and 10 belong to the first part 1a made in one piece, whereas in the first example, (FIGS. 2a and 2b), such outlet couplings 9 and 10 belong to the second part 1b made in one piece.

In the seventh example, as shown in FIGS. 8a to 8d, the connector 1 is not composed of two parts made in one piece sealing assembled, as in the examples above, but of one piece.

Two inlet couplings 5 and 6 are respectively connected to two distributors 8 and 7 through the two internal paths 23 and 24.

Considering the complexity of the internal paths 23 and 24, which are not in straight line, since the inlet couplings 5 and 6 cannot be aligned with the distributors 7 and 8, it is necessary to provide for unmolding ports 25 and 26 for each one of the internal paths 23 and 24.

Figure 8A:
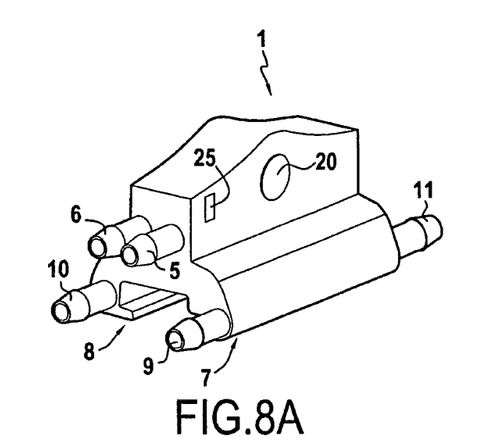
FIGS. 8a to 8d: schematically show a seventh exemplary hydraulic connector, fully or partly in perspective as per various embodiments.
Figure 8B:
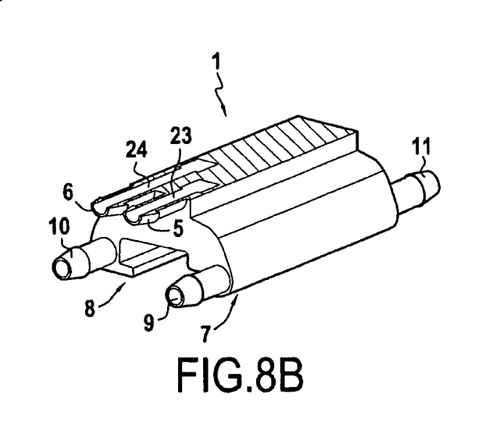

Thus, as can be seen in FIG. 8b, each one of the internal paths 23 and 24 shows a first horizontal part starting from the inlet couplings 5 and 6, respectively.

One of these first horizontal parts, for example the one corresponding to the internal path 24, slightly overlaps the other one.

As for the first two horizontal parts, the unmolding is easy since the draining of the material can be executed through the inlet couplings 5 and 6.

Figure 8C:
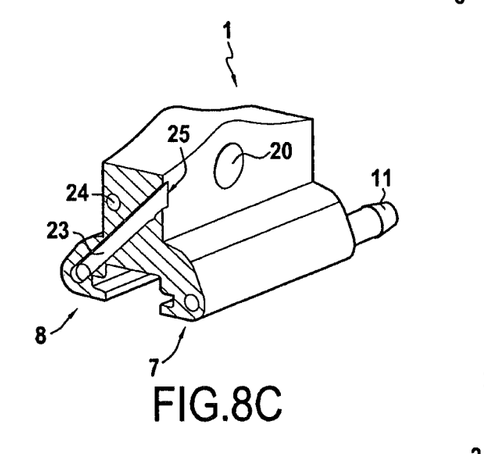
Figure 8D:
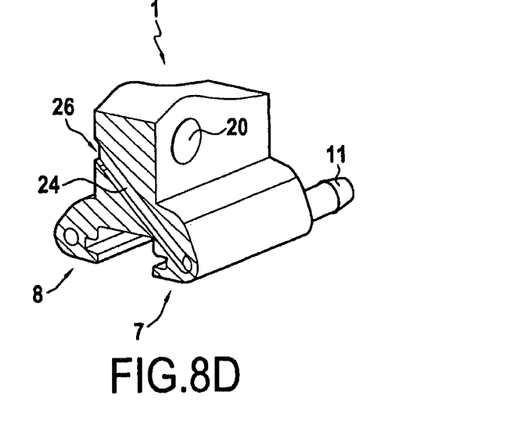

Each one of the first horizontal parts of the internal paths 23 and 24 then extends in an oblique part which joins the distributor 7 or 8, as can be seen on the sections of FIGS. 8c and 8d.

Then the internal path 23 connects the inlet coupling 5 and the transversally opposite distributor 8, and the internal path 24 connects the inlet coupling 6 and the transversally opposite distributor 7.

For each one of the oblique parts of the internal paths 23 and 24, it is thus necessary to provide for an unmolding port 25, 26 to enable the draining of the material upon the unmolding operation.

The whole description above is given as an example, and thus is not a limit to the invention.

More particularly, the exact number of inlet couplings 5, 6, of distributors 7, 8, of outlet couplings 9, 10, 11, 12, and of internal paths 23, 24 is not a limit to the invention.

LIST OF DIGITAL REFERENCES

1—hydraulic connector
   1a, 1b—parts made in one piece of the hydraulic connector
2—wiper blade
3, 4—perforated pipe carrying cleaning and de-icing fluid
5, 6—inlet couplings
7,8—rigid joining elements
9, 10, 11, 12—outlet couplings
13—spraying port
14—tips
15—deflector
16—mount
17—strip
18—wiping blade
19—adaptor
20—port for assembling in the hydraulic connector
21—port for assembling in the adaptor
22—hinge pin
23, 24—internal paths
23a, 23b, 24a, 24b—portions of the internal paths
25, 26—unmoulding ports

The invention claimed is:

1. A hydraulic connector for a motor vehicle windscreen wiper system designed to be mounted on a wiper blade fitted with perforated pipes carrying cleaning and de-icing fluid, the hydraulic connector comprising:
first inlet coupling suitable for connection to a fluid feed;
a distributor provided with outlet couplings at each of a first terminal end and a second terminal end of the distributor, the outlet couplings are configured to be connected to the perforated pipes; and
a second inlet coupling suitable for connection to the fluid feed,
wherein the hydraulic connector includes an internal path for carrying the fluid from the first inlet coupling to the distributor, and
wherein, with respect to a medial plane that bisects the hydraulic connector in a vertical direction and extends through a longitudinal direction of the hydraulic connecter, the first inlet coupling and the second inlet coupling are each distanced a first distance away from the medial plane, and the outlet couplings of the distributor are distanced a second distance away from the medial plane, and wherein the second distance is greater than the first distance.

2. The hydraulic connector according to claim 1, wherein the hydraulic connector further comprises:
a first part made in one piece, obtained by moulding a plastic material, wherein the first part includes the first inlet coupling and a first portion of the internal path, and
a second part made in one piece, obtained by moulding a plastic material, and comprising the rest of the internal path and the whole or a part of the distributor.

3. The hydraulic connector according to claim 2, wherein the first and the second parts made in one piece are sealingly assembled by ultrasonic welding or by over-moulding a joint made of a same plastic material as that of said first and said second parts.

4. The hydraulic connector according to claim 1, wherein the hydraulic connector is assembled to a wiper blade provided with two perforated pipes carrying cleaning and de-icing fluid, the hydraulic connector comprising:
two of the distributor, each provided with the outlet couplings,
wherein the outlet couplings of the two distributors are configured to be connected to either one of the two perforated pipes, and
wherein the outlet couplings of the two distributors are both distanced further away from the medial plane than the first inlet coupling.

5. The hydraulic connector according to claim 4, wherein one of the two distributors, or both distributors is/are provided with a port in the middle thereof.

6. The hydraulic connector according to claim 1, wherein the first inlet coupling is a male coupling of a canula type, configured to be connected to a female fluid feed.

7. The hydraulic connector according to claim 1, wherein the at least one inlet coupling is a female coupling of the port type at the surface of the hydraulic connector, intended to be connected to a male fluid feed.

8. A windscreen wiper system for a motor vehicle comprising:
a wiper blade fitted with a perforated pipe carrying cleaning and de-icing fluid, and connected to a drive arm by an adaptor;
wherein the adaptor is rotatingly connected to the hydraulic connector according to claim 1,
wherein the outlet couplings of the hydraulic connector are connected to the perforated pipes, and
wherein the first inlet coupling of the hydraulic connector is connected to the fluid feed.

9. A wiper blade for a wiper blade system for a motor vehicle provided with perforated pipes carrying cleaning and de-icing fluid, the wiper blade comprising:
a hydraulic connector, the hydraulic connector comprising:
first inlet coupling suitable for connection to a fluid feed;
a distributor provided with outlet couplings at each of a first terminal end and a second terminal end of the distributor, the outlet couplings are configured to be connected to the perforated pipes;

a second inlet coupling suitable for connection to the fluid feed; and an internal path for carrying the fluid from the first inlet coupling to the distributor, wherein, with respect to a medial plane that bisects the hydraulic connector in a vertical direction and extends through a longitudinal direction of the hydraulic connecter, the first inlet coupling and the second inlet coupling are each distanced a first distance away from the medial plane, and the outlet couplings of the distributor are distanced a second distance away from the medial plane, and wherein the second distance is greater than the first distance.

10. The hydraulic connector according to claim 1, wherein the hydraulic connector is composed of a monolithic body, and obtained by moulding a plastic material.

11. The hydraulic connector according to claim 1, wherein the first inlet coupling is oriented parallel to the distributor.

12. The hydraulic connector according to claim 1, wherein the wiper blade is configured to be connected to a drive arm via an adaptor rotatingly connected to the hydraulic connector by a hinge axis and assembling holes respectively provided in the hydraulic connector and the adaptor.

13. The wiper blade according to claim 9, wherein the hydraulic connector is composed of a monolithic body, and obtained by moulding a plastic material.

14. The wiper blade according to claim 9, wherein the first inlet coupling is oriented parallel to the distributor.

15. The wiper blade according to claim 9, wherein the wiper blade is configured to be connected to a drive arm via an adaptor rotatingly connected to the hydraulic connector by a hinge axis and assembling holes respectively provided in the hydraulic connector and the adaptor.

16. A hydraulic connector of a motor vehicle windscreen wiper system configured to be mounted on a wiper blade fitted with a perforated pipe carrying cleaning and de-icing fluid, the hydraulic connector comprising:

an inlet coupling suitable for connection to a fluid feed;

a distributor provided with an outlet coupling that connects to the perforated pipe where the wiper blade is mounted, an assembling hole for rotating connection;

wherein the inlet coupling is oriented parallel to the distributor, wherein the hydraulic connector includes an internal path for carrying the fluid from the inlet coupling to the distributor, wherein, with respect to a medial plane that bisects the hydraulic connector in a vertical direction and extends through a longitudinal direction of the hydraulic connecter, the outlet coupling of the distributor is distanced further away from the medial plane than the inlet coupling, and wherein an axis of the assembling hole is perpendicular to the medial plane.

* * * * *